(12) United States Patent
Guérin et al.

(10) Patent No.: US 6,228,152 B1
(45) Date of Patent: May 8, 2001

(54) FILTERING DEVICE FOR EQUIPPING A VENTILATION AND/OR HEATING AND/OR AIR CONDITIONING UNIT, MORE PARTICULARLY FOR A MOTOR VEHICLE

(75) Inventors: Richard Guérin, Ronfeugerai; Gérard Jacq, Athis de L'Orne; Claude Navarro, Breel, all of (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 09/367,881

(22) PCT Filed: Dec. 22, 1998

(86) PCT No.: PCT/FR98/02816

§ 371 Date: Aug. 18, 1999

§ 102(e) Date: Aug. 18, 1999

(87) PCT Pub. No.: WO99/32311

PCT Pub. Date: Jul. 1, 1999

(30) Foreign Application Priority Data

Dec. 22, 1997 (FR) .................................................. 97 16262

(51) Int. Cl.$^7$ ............................. B01D 53/04; B01D 46/12
(52) U.S. Cl. ................................ 96/135; 96/138; 96/153; 55/497; 55/500; 55/501; 55/509; 55/513; 55/521
(58) Field of Search .............................. 96/135, 137, 138, 96/153, 154; 55/495, 497, 500, 501, 509, 513, 521, 528, DIG. 31, DIG. 35, DIG. 42

(56) References Cited

U.S. PATENT DOCUMENTS

| | | | |
|---|---|---|---|
| 4,013,566 | * | 3/1977 | Taylor ................................ 96/153 X |
| 4,181,513 | * | 1/1980 | Fukuda et al. .......................... 96/153 |
| 4,259,096 | * | 3/1981 | Nakamura et al. ..................... 96/138 |
| 4,517,308 | * | 5/1985 | Ehlenz et al. ........................ 96/153 X |
| 4,731,135 | | 3/1988 | Tani et al. ............................ 156/62.6 |
| 5,069,694 | * | 12/1991 | Cullen et al. ........................... 96/154 |
| 5,509,950 | | 4/1996 | Van de Graaf et al. ................ 55/486 |
| 5,616,169 | * | 4/1997 | de Ruiter et al. .................. 96/135 X |
| 5,630,940 | | 5/1997 | Van Rossen et al. ................ 210/484 |
| 5,639,287 | * | 6/1997 | Van de Graaf et al. ........... 55/500 X |
| 5,679,122 | | 10/1997 | Moll et al. ............................... 55/497 |
| 5,989,303 | * | 11/1999 | Hodge ................................ 55/497 X |
| 6,059,852 | * | 5/2000 | Olson ..................................... 55/495 |

FOREIGN PATENT DOCUMENTS

| | | |
|---|---|---|
| 28 20 313 | 11/1979 | (DE) . |
| 38 15 907 | 12/1988 | (DE) . |
| 40 39 288 | 6/1992 | (DE) . |
| 0 383 236 | 8/1990 | (EP) . |
| 2032298 * | 5/1980 | (GB) .................................... 96/154 |
| 2238731 * | 12/1991 | (GB) .................................... 96/138 |
| WO93/12858 | 7/1993 | (WO) . |
| WO98/17368 | 4/1998 | (WO) . |

OTHER PUBLICATIONS

International Search Report dated Apr. 19, 1999.

* cited by examiner

Primary Examiner—Robert H. Spitzer
(74) Attorney, Agent, or Firm—Morgan & Finnegan LLP

(57) ABSTRACT

A filter device has a frame, a grid, a filter medium and, if desired, a gas adsorption medium. The frame is flexible so as to be temporarily deformable and is made of polypropylene, as is the grid. The filter medium is a mat of non-woven material and the gas adsorption medium is activated carbon.

38 Claims, 5 Drawing Sheets

FILTERING DEVICE FOR EQUIPPING A VENTILATION AND/OR HEATING AND/OR AIR CONDITIONING UNIT, MORE PARTICULARLY FOR A MOTOR VEHICLE

BACKGROUND OF THE INVENTION

The present invention relates to a filter device for equipping an apparatus for ventilating and/or heating and/or air conditioning, more particularly for a vehicle.

A first object of the invention is to improve the efficiency and useful life of such a filter device.

Another object of the invention is to make it easier to change the filter device when it is clogged.

Yet another object of the invention is to make it easier to recycle such a filter device, in particular where the filter includes means for adsorbing harmful gases.

BRIEF SUMMARY OF THE INVENTION

These objectives are obtained by one or other of the following features of the invention, and by any of their technically possible combinations:

- the filter device includes a flexible grid which is surrounded by a relatively flexible frame;
- a mat of non-woven material, comprising of a carded web, is applied against the grid and constitutes a particle filter;
- the mat of non-woven material comprising of a carded web is applied against the grid without being fixed to the latter;
- the carded web constitutes a single fabric layer;
- the carded web is placed upstream of the grid in relation to the normal direction of flow of the gas to be filtered;
- the filter device includes gas adsorption means placed between the grid and the non-woven mat;
- the adsorption means comprise an activated carbon tissue;
- the activated carbon tissue is flexible;
- the adsorption means comprise a bed of activated carbon;
- a mat of non-woven material, comprising of a carded web, is disposed on either side of the adsorption means;
- a second grid, being a so-called inlet grid, is disposed upstream of the mat of non-woven material;
- both grids are of the same nature;
- the two grids are of different natures;
- at least one of the dimensions of the carbon tissue and preferably each of them, is smaller than the corresponding dimensions of the grid or each grid and that of the frame, so that on at least one side of the carbon tissue, the latter is at least partially spaced away from the frame;
- one grid, or preferably both grids, are pleated;
- the non-woven mat is pleated;
- the carbon tissue is pleated;
- the grid is of polypropylene;
- the second grid is of polypropylene;
- the mat of non-woven material is based on long fibres, the length of which is preferably at least 38 mm;
- the long fibres have a mean diameter which at least 10 $\mu$m;
- the fibres are of thermoplastic material;
- the fibres are polypropylene fibres;
- the frame is of polypropylene foam or porous polypropylene;
- the frame is fixed to the grid by mirror welding
- the frame is fixed to the outlet grid, and also to the second grid, by mirror welding;
- the frame is moulded over the grid;
- the frame is moulded over the grid and over the mat of non-woven material;
- the frame is also moulded over the second grid;
- all or some of the lateral ends of the grid are curved in such a way as to follow the corresponding wall or walls of the frame.

The filter device in accordance with the invention has improved efficiency and offers a reduced loss of energy in the air to be filtered than do the filters in the state of the art.

In addition, the filter device according to the invention is preferably in the form of a flexible cassette, which is such that it can be deformed temporarily in all directions while being inserted or removed in an apparatus for ventilating and/or heating and/or air conditioning, which considerably facilitates the corresponding operations, especially where accessibility to the housing of the filter device is, as is most commonly the case, not easy to obtain.

Thanks to the construction of the filter device according to the invention, the assembly of the various parts of the filter can be carried out without making use of any solvent or adhesive, while excellent sealing is obtained between the frame and the various active parts of the filter.

The flexibility of the frame advantageously enables it to be sealed at its periphery without there being any need to provide a sealing gasket.

In addition, the flexibility of the frame contributes to the prevention and absorption of vibrations and noises in the filter, and in the duct in which the filter is placed.

After use, the filter device according to the invention can easily be recycled after its various component parts have been separated from each other, which is facilitated in particular when the carbon tissue is out of contact with the frame.

BRIEF DESCRIPTION OF THE DRAWINGS

Further features and advantages of the invention will appear in the description of embodiments thereof, given below by way of example and with reference to the attached drawings, which show.

DETAILED DESCRIPTION OF THE INVENTION

Figure 1:
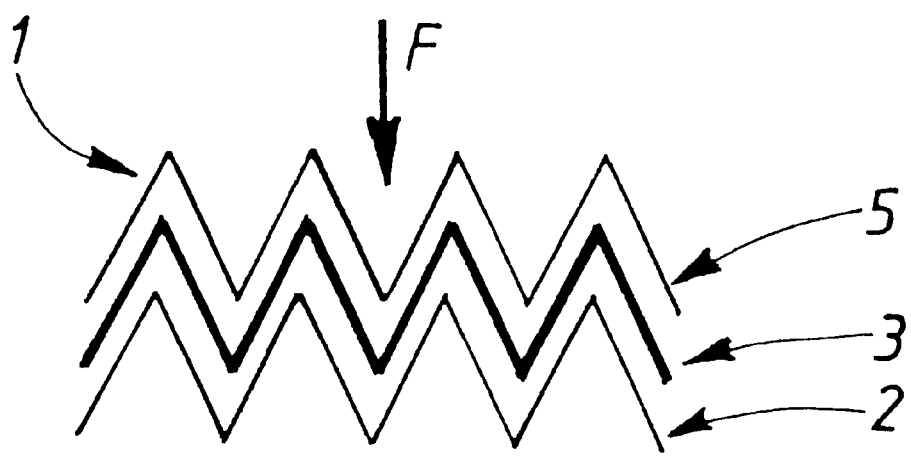
in FIG. 1, a diagrammatic view in cross section, showing part of a filter device according to the invention.

The filter device 1 of FIG. 1 comprises a flexible grid 2 of pleated form, against which there is disposed, without being fixed a filter medium 3 which constitutes a particle filter in the form of a non-woven mat, comprising of a carded web and a single fabric layer. The filter medium 3 is itself pleated in the same way as the grid 2.

The non-woven mat comprises long fibres, the length of which is preferably at least 38 mm. The said long fibres have a mean diameter which is at least 10 µm. The fibres are of thermoplastic material and, in practice, are polypropylene.

The grid 2 is of polypropylene. It is located downstream with respect to the direction F of flow of the air in the filter device.

In the example in FIG. 1, a pleated, flexible second grid 5 is arranged in such a way that the filter medium 3 is placed between the grids 2 and 5 without being fixed to either one of these two grids 2 and 5.

Preferably, the second grid, which is a so-called inlet grid, is located upstream of the medium 3 in the direction F of flow of the air in the filter device.

Preferably, the second grid 5 is of the same nature as the grid 2, and is of polypropylene.

In another version, the two grids 2 and 5 are of different natures.

The filter device of FIG. 1 is a particle filter.

The invention is also concerned with a so-called combined filter, a particle filter in combination with a filter for blocking harmful gases.

In that case, gas absorption means 4 are added to the base structure of FIG. 1 comprising of the downstream grid 2 and the medium 3, and are placed between the grid 2 and the medium 3 in such a way as to be in the following succession in the direction F of flow of the air: medium 3, gas adsorption means 4, and the flexible grid 2 downstream.

Figure 2:
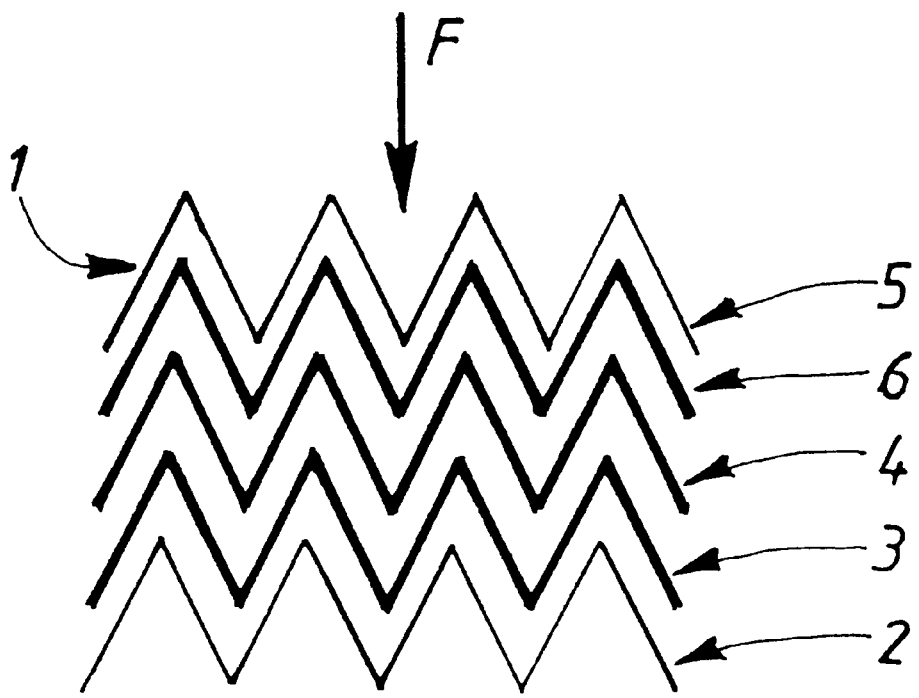
in FIG. 2, a view similar to that in FIG. 1 but corresponding to another embodiment of the invention.

FIG. 2 shows a combined filter which includes, in succession in the direction F of flow of the air: an inlet grid 5, a medium 6, gas adsorption means 4, a medium 3 and an output grid 2. The media 3 and 6 are preferably of the same nature, as described above. Accordingly, each of two non-woven mats 3 and 6 is in the form of a carded web, and these are disposed respectively on either side of the gas adsorption means 4.

The gas adsorption means may comprise a bed of activated carbon, but preferably, and as shown in FIG. 2, comprises a pleated tissue of flexible carbon, pleated in the same way as the grid 2 or 5 and the medium 3 or 6.

The filter device of FIG. 2 has a symmetrical construction which has the advantage that it can be fitted indifferently in either one direction or the other in an apparatus for heating and/or ventilating and/or air conditioning, which makes it unnecessary to provide any indexing means to determine the fitting direction. The filter device is thus reversible. In this case, the inlet grid may of course act as an outlet grid, and conversely the outlet grid may act as an inlet grid.

A flexible frame is arranged to support the various components of the filter device. One such flexible frame is shown at 7 in FIG. 3. Although FIG. 3 corresponds to the embodiment of FIG. 2, the arrangements in relation to the frame described below are also applicable to other embodiments, and in particular to the embodiment described with reference to FIG. 1.

The frame 7 is made of polypropylene foam or, in another version, of porous polypropylene, and is fixed to the outlet grid 2 or the inlet grid 5, and preferably to both of the grids 2 and 5 where both are present.

Figure 4:
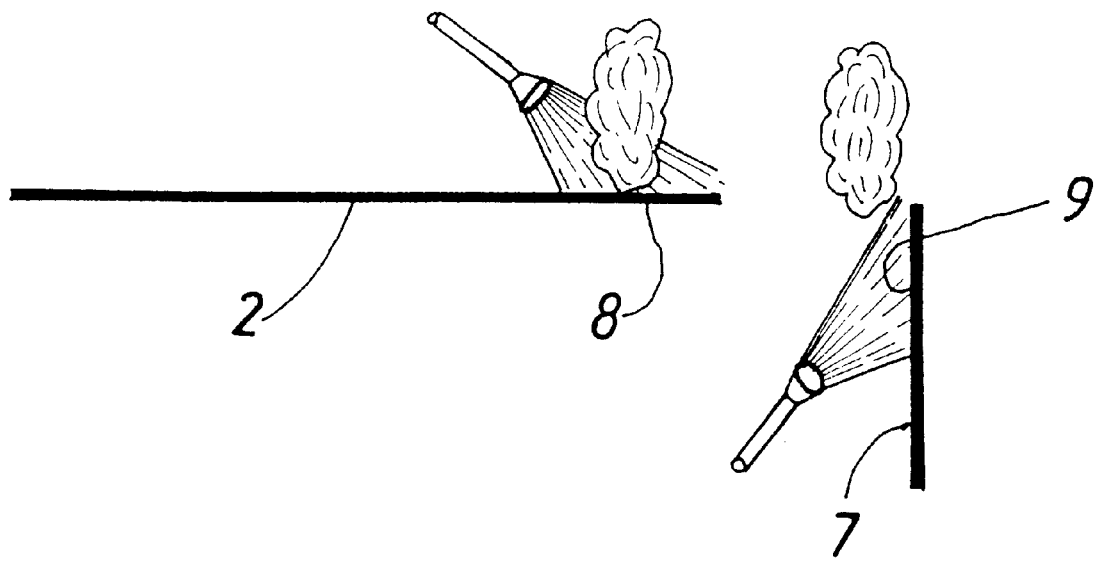
in FIGS. 4 and 5, diagrammatic views which illustrate the fastening of a grid to the frame of the filter device.
Figure 5:
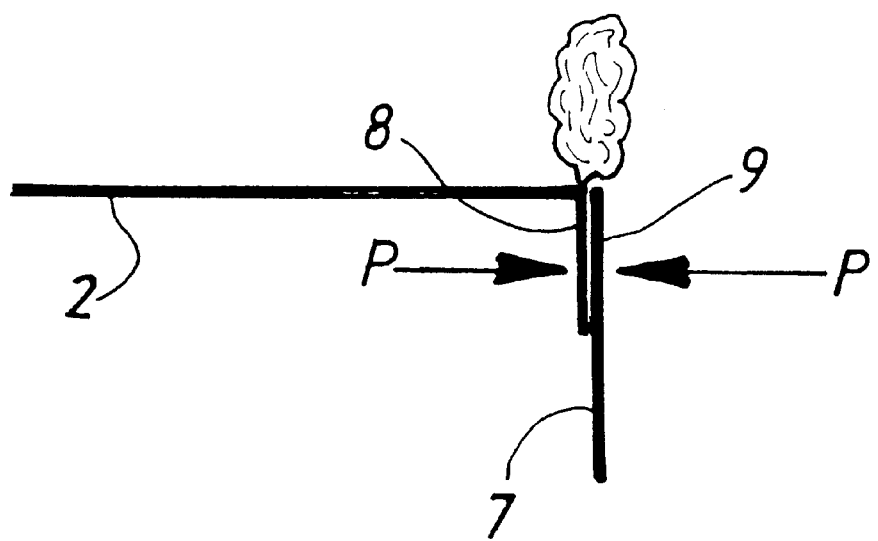

The fastening of a grid 2 or 5 to the frame 7 is preferably obtained, as indicated diagrammatically in FIGS. 4 and 5, by a so-called mirror welding operation which consists in simultaneously heating, up to the onset of melting, a peripheral portion 8 of the grid 2 or 5 on the one hand, and a portion 9 of the frame 7 corresponding to the fastening zone on the other hand, and then bringing together and clamping against each other the above mentioned peripheral portion 8 and portion 9, such that a relative pressure is exerted as indicated diagrammatically by the arrows P in FIG. 5.

The mirror welding operation is performed in such a way that the lateral end 8 of the grid 2 or 5 is caused to bend at a right angle so as to follow the form of the corresponding internal face of the frame 7, which advantageously improves fastening of the grid and avoids any leakage of air between the grid and the frame.

Preferably, a plurality of peripheral portions 8 and corresponding portions 9, and preferably all four of the grid 2 or 5 and the frame 7, are fixed together in this way.

Figure 3:
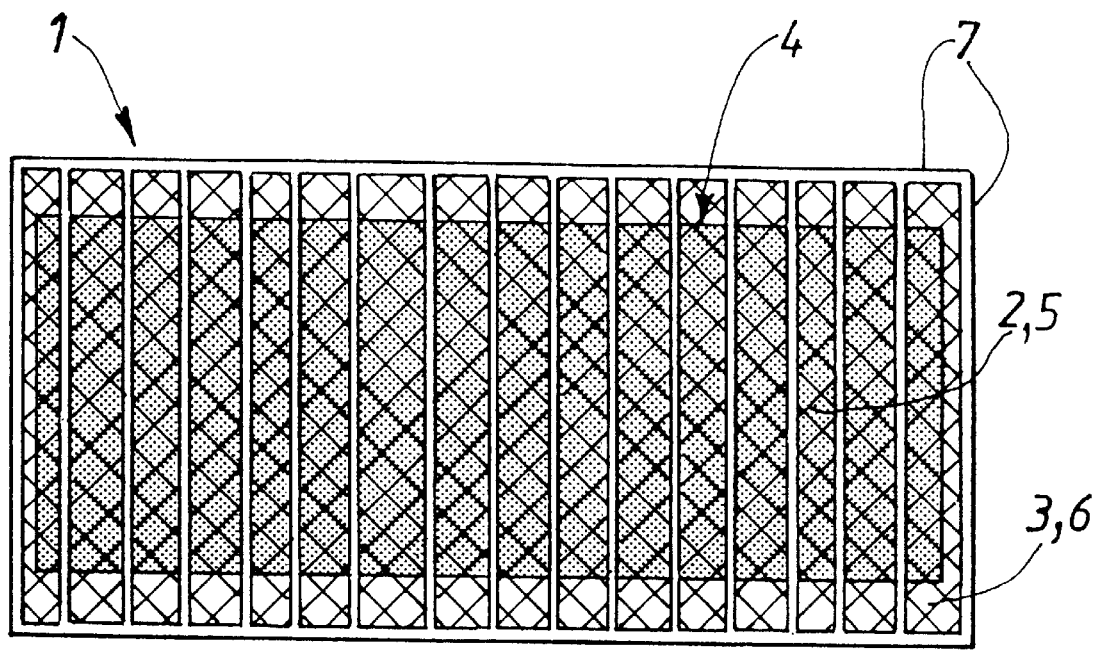
in FIG. 3, a front view of the filter device of FIG. 2.

As is shown in FIG. 3, the two grids 2 and 5 are fixed to the frame 7 in the manner just described.

The fact that the grid 2 or 5 and the frame 7 are of the same chemical nature (polypropylene) enables the fastening to be solid and durable.

During the mirror welding operation, the non-woven mat or mats are laid against the corresponding grid or grids 2 and/or 5, with, if necessary, adsorption means 4, such as, and preferably, carbon tissue, interposed in the manner described above.

In another version not shown, the frame is moulded around the grid 2 or 5, or around both of the grids 2 and 5, and also on the filter medium or media 3 and/or 6.

In accordance with a major aspect of the invention, the adsorption means 4, which are preferably in the form of an activated carbon tissue, extend on at least one side, and preferably on all four sides, by an amount which is smaller than that of the grid 2 and/or 5 and preferably also smaller than that of the filter medium 3 and/or 6. This can be seen in FIG. 3, in which it can be observed that the dimensions of the activated carbon tissue 4 are smaller than those of the grids 2 and 5 and the filter media 3 and 6.

As a result, the adsorption means are spaced away from the frame 7. This has the advantage that the presence of the adsorption means does not disturb the fastening of the grids to the frame, and when a used filter is being recovered it is easily possible, by sectioning the grid or grids, to recover the adsorption means which are a major element in the selling price of a filter, so that they can be regenerated and reused in a new filter.

Figure 6A:
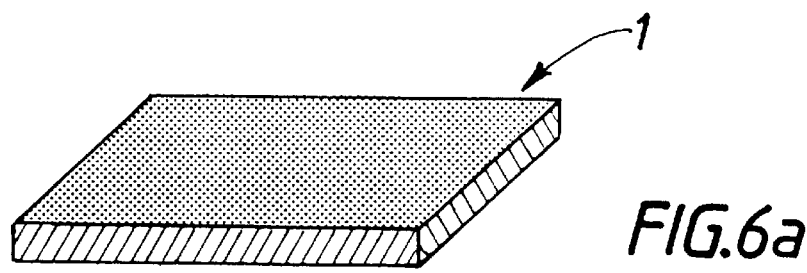
in FIGS. 6a and 6b, an illustration of the properties of flexibility of the filter.
Figure 6B:
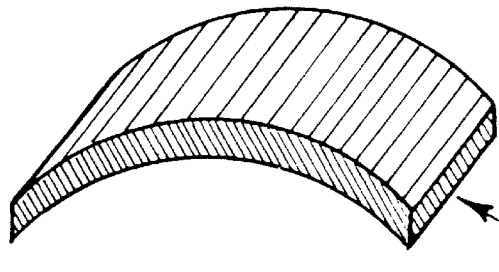

By virtue of the way the filter is made, as described above, the latter has important features of flexibility which enable it to be curved momentarily as shown in FIGS. 6a and 6b, or even to be bent, in order that the filter can more easily be introduced into or removed from for heating and/or ventilating and/or air conditioning a motor vehicle. This is of particular advantage where, as is very often the case, accessibility to the housing of the filter is difficult to achieve.

Figure 7:
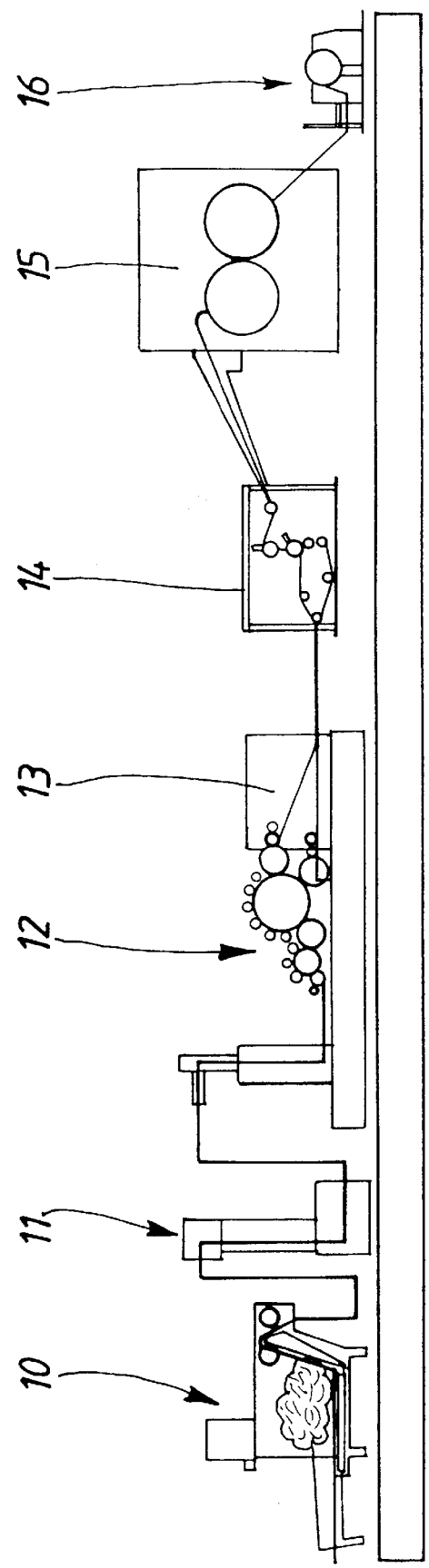
in FIGS. 7 and 8, a diagrammatic view of the manufacture of the filter device according to the invention.
Figure 8:
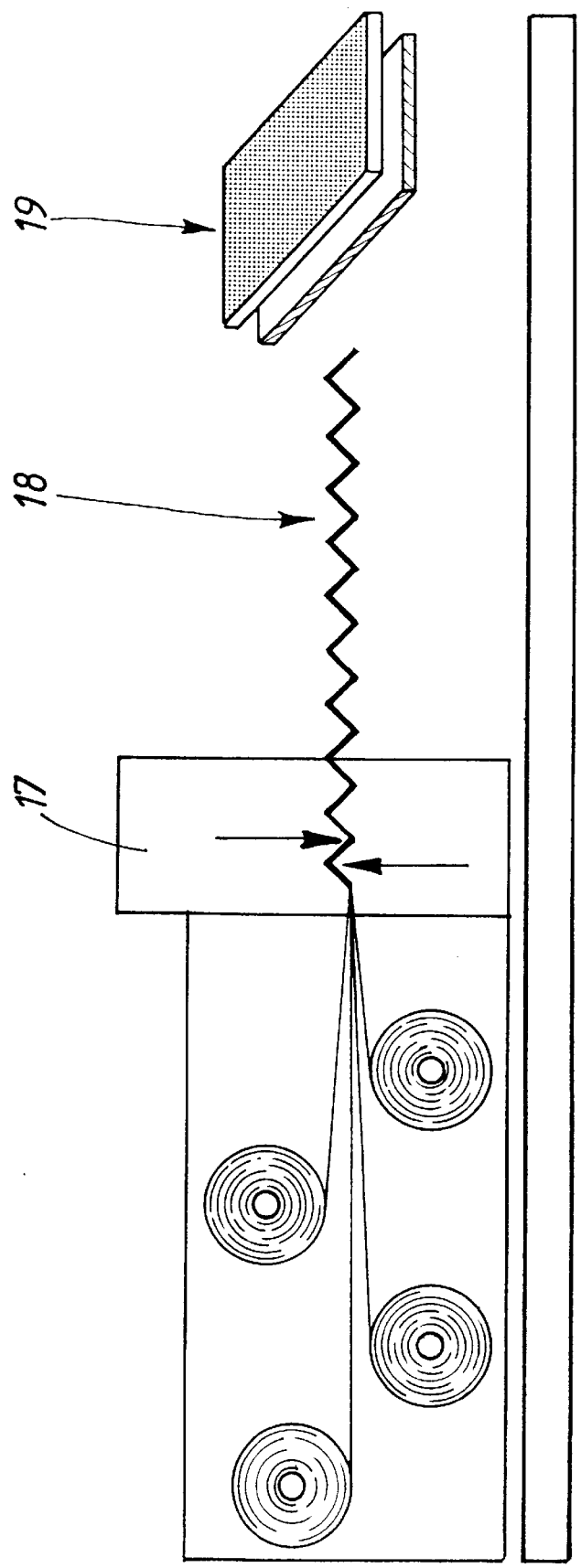

FIGS. 7 and 8 illustrate a preferred method of making a filter device as described above.

Polypropylene filters having a fineness of 1.7 dtex (diameter 14 µm), cut to a length of 40 mm, are introduced into a mixer.

The mixture of fibres obtained is then introduced into a feeder 10 and then into a storage silo 11, before being carded, into an isotropic card web by means of a wool-type card 12 with a double comb and equipped with a pell-mell type stirrer.

The web is, at the outlet of the card, introduced into a condenser 13 so as to form a fabric layer.

The parameters of the card and those of the condenser are so chosen that a fabric layer is obtained which has a surface density of about 20 at about 150 g/m².

The fabric layer is deposited on a carpet and is then consolidated by means of an hydraulic binding operation at 14.

The hydraulic binding operation consists in passing the fabric layer, disposed on a rotating drum, through very fine water jets under high pressure (40 to 200 bar).

By rebounding on the drum, the water jets cause the fibres to knit together, which gives to the fabric layer a high mechanical strength without increasing its density.

After being passed through a drying tunnel 15, the fabric layer is rolled up at 16.

The fabric layer is subsequently undergoes a pleating operation at 18, and is then ready to be cut into sections 9 and to be mounted on a support so as to form the filter device described above.

In accordance with the invention, the filter device comprises a fabric layer of a single layer.

In that connection, with a fabric layer 0.84 mm thick, it has been possible to make a filter which has a surface density of 66 g/m$^2$ and with a density of 0.07.

In order to test the effectiveness of the filter made in this way, the filter was placed across a passage having a cross section equal to 100 cm$^2$, with a stream of air charged with particles being passed through it at a velocity of 20 cm/s.

The particles were those of a powder of the so-called "SAE fine powder" type, which is defined by Standard SAE J726/ISO5011 of the United States of America.

The concentration of the particles was 100 mg/m$^3$.

It was found that the loss of energy on passing through the filter under these conditions was only 14 Pa, and that efficiency reaches 80%.

As to filter devices currently on the market, an efficiency was obtained comparable to the best of these, but with a product having a much lower density (0.07, as against 0.12 to 0.30) and giving rise to a generally smaller loss of energy.

Endurance tests have, in addition, shown improved stability, over time, in the efficiency of the filter device in accordance with the invention.

What is claimed is:

1. A filter for a climate control apparatus comprising
   a frame,
   a first grid, and
   a filter medium, wherein the frame and the first grid are flexible such that the filter is able to be temporarily deformed in all directions while being inserted in or removed from said climate control apparatus.

2. A filter according to claim 1, wherein the first grid is made of polypropylene.

3. A filter according to claim 1 wherein the frame is polypropylene.

4. A filter according to claim 1, wherein the frame is a foam material.

5. A filter according to claim 1, wherein the filter medium comprises a mat of non-woven carded web material.

6. a filter according to claim 5, wherein said mat of non-woven carded web material is applied against the first grid without being fixed to the first grid.

7. a filter according to claim 6, wherein said mat constitutes a single fabric layer.

8. a filter according to claim 7, wherein said climate control apparatus has a normal direction of flow of gas to be filtered and wherein said mat is placed upstream of the first grid in relation to the normal direction of flow of the gas to be filtered.

9. A filter according to claim 5, wherein the mat of non-woven carded web material is based on long fibres having a length greater than about 38 mm.

10. A filter according to claim 9, wherein the long fibres have a mean diameter which is substantially at least 10 µm.

11. A filter according to claim 10, wherein the long fibres are polypropylene fibres.

12. a filter according to claim 9, wherein the long fibres are thermoplastic material.

13. A filter according to claim 1, which further comprises a gas adsorption member placed between the first grid and the filter medium.

14. A filter according to claim 13, wherein the adsorption member comprises an activated carbon tissue.

15. A filter according to claim 14, wherein the activated carbon tissue is flexible.

16. A filter according to claim 14, wherein the first grid and the activated carbon tissue are pleated.

17. A filter according to claim 14, wherein at least one dimension of the activated carbon tissue is smaller than a corresponding dimension of the first grid and a corresponding dimension of the frame so that on at least one side of the activated carbon tissue, the activated carbon tissue is at least partially spaced away from a side of the frame.

18. A filter according to claim 13, wherein said adsorption member comprises a bed of activated carbon.

19. A filter according to claim 13, which further comprises a second filter medium disposed between the first grid and said adsorption member.

20. A climate control apparatus including the filter of claim 19.

21. A filter according to claim 13, wherein a second grid is disposed upstream of the filter medium.

22. a filter according to claim 21, wherein said first grid and said second grid are of the same nature.

23. A filter according to claim 21, wherein the frame is fixed to the first grid and the second grid by mirror welding.

24. A filter according to claim 21, which is of symmetrical construction, and reversible.

25. A filter according to claim 1, wherein the frame is fixed to the first grid by mirror welding.

26. A filter according to claim 25, wherein at least one lateral end of the first grid is curved in such a way as to follow a corresponding wall of the frame.

27. A filter according to claim 1, wherein the frame is moulded over the first grid.

28. a filter according to claim 27, wherein the frame is moulded over the filter medium.

29. A filter device for a climate control apparatus having a normal flow direction for gas that is to be filtered therein, said filter comprising:
   a frame, said frame flexible and temporarily deformable;
   a first grid, said first grid flexible and temporarily deformable; and
   a first filter medium comprising a single-fabric-layer mat of non-woven carded web material, said first filter medium positioned adjacent said first grid, said first grid and said first filter medium held within said frame.

30. The filter device according to claim 29 wherein said first grid and said frame are made of polypropylene or a foam material.

31. The filter device according to claim 29 further comprising
   a gas adsorber positioned between said first grid and said first filter medium, said gas adsorber comprising a flexible activated carbon tissue or a flexible bed of activated carbon.

32. The filter device according to claim 31 wherein said first filter medium is positioned upstream of said first grid in relation to said normal flow direction, the filter device further comprising
   a second filter medium comprising a single-fabric-layer mat of non-woven carded web material, said second filter medium positioned between said gas adsorber and said first grid.

33. The filter device according to claim 32 further comprising a second grid, said second grid positioned upstream of said first filter medium.

34. The filter device according to claim 33 wherein said first grid, said second filter medium, said gas adsorber, said first filter medium and said second grid are pleated.

35. The filter device according to claim 29 wherein at least one dimension of said first filter medium is smaller than a corresponding dimension of said first grid and a corresponding dimension of said frame so that at least one side of said first filter medium is at least partially spaced from a side wall of said frame.

36. The filter device according to claim 29 wherein said first filter medium is comprised of thermoplastic fibres having a length greater than about 38 mm and a mean diameter substantially at least 10 $\mu$m.

37. The filter device according to claim 29 wherein said frame is fixed to said first grid via mirror welding.

38. The filter device according to claim 29 wherein a lateral end of said first grid is curved to correspond to the contour of a side wall of said frame.

* * * * *